(12) United States Patent
Matthijsse et al.

(10) Patent No.: US 7,203,408 B2
(45) Date of Patent: Apr. 10, 2007

(54) OPTICAL FIBRE

(75) Inventors: Pieter Matthijsse, Hapert (NL); Myrna Boon, Eindhoven (NL)

(73) Assignee: Draka Fibre Technology B.V., Eindhoven (NL)

( * ) Notice: Subject to any disclaimer, the term of this patent is extended or adjusted under 35 U.S.C. 154(b) by 0 days.

(21) Appl. No.: 11/001,319

(22) Filed: Dec. 2, 2004

(65) Prior Publication Data

US 2005/0141835 A1 Jun. 30, 2005

(30) Foreign Application Priority Data

Dec. 4, 2003 (NL) .................................. 1024942

(51) Int. Cl.
*G02B 6/036* (2006.01)
(52) U.S. Cl. ........................................ 385/128; 385/80
(58) Field of Classification Search .................... None
See application file for complete search history.

(56) References Cited

U.S. PATENT DOCUMENTS

| 4,000,936 | A | * | 1/1977 | Gloge ........................ 385/102 |
| 4,682,850 | A | * | 7/1987 | White et al. ................. 385/109 |
| 4,850,664 | A | | 7/1989 | Iri et al. |
| 4,911,526 | A | * | 3/1990 | Hsu et al. .................... 385/115 |
| 4,923,275 | A | * | 5/1990 | Kaukeinen .................... 385/53 |
| 5,208,887 | A | * | 5/1993 | Grinderslev .................. 385/81 |
| 5,291,570 | A | * | 3/1994 | Filgas et al. .................. 385/78 |
| 5,381,504 | A | * | 1/1995 | Novack et al. ............. 385/128 |
| 5,644,670 | A | * | 7/1997 | Fukuda et al. .............. 385/124 |
| 5,887,104 | A | * | 3/1999 | Sugizaki et al. ............ 385/123 |
| 6,895,156 | B2 | * | 5/2005 | Walker et al. .............. 385/128 |
| 2003/0007742 | A1 | * | 1/2003 | Kowatsch .................... 385/80 |

FOREIGN PATENT DOCUMENTS

| EP | 0 311 186 | 4/1989 |
| EP | 0 568 382 A | 11/1993 |
| EP | 1 278 085 A | 12/2003 |
| WO | 99/57589 A | 11/1999 |

* cited by examiner

*Primary Examiner*—Rodney Bovernick
*Assistant Examiner*—Mike Stahl
(74) *Attorney, Agent, or Firm*—Oblon, Spivak, McClelland, Maier & Neustadt, P.C.

(57) ABSTRACT

An optical fibre having an NA-value of less than 0.34, which optical fibre is built up of a core and an enveloping protective coating, wherein the protective coating forms the outer layer of the optical fibre, which optical fibre has an NA-value ranging from 0.15 to 0.30, with the overall external diameter of the optical fibre corresponding to the internal diameter of an element into which the end of the optical fibre is inserted.

6 Claims, No Drawings

OPTICAL FIBRE

The present invention relates to an optical fibre having an NA-value of less than 0.34, which optical fibre is built up of a core and an enveloping protective coating.

Such an optical fibre is known per se from U.S. Pat. No. 5,381,504, which optical fibre has an NA-value ranging from 0.08 to 0.34, with the protective coating affixed to the outer surface of the optical fibre having a Shore D hardness value of 65 or more. The optical fibre element that is known therefrom is in particular composed of an optical fibre, a protective coating surrounding said fibre and a buffer, which encloses the protective coating, thus forming the outer layer of the element. The optical fibre in fact includes a core and a cladding. The protective coating is further built up of an inner, resilient layer and an outer, rigid layer, which inner, resilient layer provides the optical fibre element with protection against microbending losses, whilst the outer, rigid layer protects the underlying layers from abrasion and mechanical damage. When such an optical element is connected to a connector, the buffer layer must be stripped from one end of the optical fibre element over a certain length to make it possible to insert the optical fibre correctly into the connector and adhere it thereto. During connectorization, however, the protective coating remains present on the external surface of the optical fibre. When this method is used, the protective coating prevents the optical fibre from being damaged by the tool that is used for removing the buffer layer. In addition, the protective coating prevents the optical fibre from coming into contact with water vapour or dust, which environmental influences have an adverse effect on the durability and the optical performance of the optical fibre.

As a result of the increase of the bit speed in the current glass fibre communication systems, the bit speed of various connections in the equipment itself increases as well. In addition, the requirements as regards the volume and the energy consumption of the various parts of the equipment are becoming increasingly stringent. In spite of a drastic miniaturisation of various (sub) components, the overall volume of the system racks that form the heart of the current telecommunication systems continues to increase. As a result of the increase in the bit speed, in combination with the increase of the distances to be bridged between the various parts in such enlarged system cabinets, special attention is currently being paid to the use of optical technology in so-called printed circuit boards (PCB's) both in the plug-in modules and in the back panels (BP's) of system cabinets, and eventually the copper wire technology that has been used so far will disappear altogether.

It is a generally known fact that when the distance between a transmitter and a receiver increases, the absolute attenuation in so-called polymer waveguides will be a restrictive factor. If so-called "step index" type optical fibres are used, the bandwidth will be a restrictive factor when larger distances are used. Moreover, it is a known fact that the use of polymer optical fibres having a small diameter, which have a low breaking strength, will lead to problems when an automated process for providing the wiring is used. On the other hand, when standard quartz optical fibres are used, which have a considerably higher breaking strength, the aforesaid problem will not occur, but the mounting costs will increase undesirably, because the connectors to be used make it necessary to strip such optical fibres of their protective coating first. The removal of the protective coating leads to an increased risk of subsequent fracture.

One aspect of the present invention is to provide an optical fibre whose protective coating need not be stripped when such a fibre is used in a connector.

Another aspect of the present invention is to provide an optical fibre that is configured to minimise the risk of the optical fibre coming loose or being displaced when such an optical fibre is placed in a connector.

Another aspect of the present invention is to provide an optical fibre having a core diameter such that when optical fibres are coupled together, there will be no unacceptable coupling losses that might lead to excessive attenuation of the optical signal.

The invention as referred to in the introduction is characterized in that the protective coating forms the outer layer of the optical fibre, which optical fibre has an NA-value ranging from 0.15 to 0.30, with the overall external diameter of the optical fibre corresponding to the internal diameter of an element into which the end of the optical fibre is inserted.

One or more aspects of the present invention are met when the aforesaid optical fibre is used. In particular, the present invention makes use of quartz glass optical fibres, wherein the external diameter of the protective coating corresponds to the internal diameter of the connectors to be used for standard glass fibres having a glass diameter of 125 µm.

For a lens or a fiber, the NA (Numerical Aperture) historically is defined as the sine of half the maximum angle of acceptance, $\propto$:

For a multimode fiber, only meridional rays leading to guided core modes are considered. In the case of graded index fibers, core refractive index depends on the core profile: the largest acceptance angle is measured at the core center. Accordingly, the core center's index must be used to calculate the NA (Numerical Aperture).

As the direction of the light rays is reversible, the NA (Numerical Aperture) is usually determined by the maximum far-field angle of the fiber output. The power density (irradiance) is not measured on a plane, but on a sphere.

Since these measurements do not show a clear cut-off angle, one proposed standard for measuring the NA (Numerical Aperture) of graded-index fibers suggests the evaluation of the far field of a 2 m piece of fiber. The sine of the 5% optical power angle, corresponding to −13 $dB_{opt}$ has been found to be in best agreement with the NA (Numerical Aperture). At the input, the fiber must be overfilled with a large spot size, and a mode stripper must be used to remove the cladding modes. This results in skew rays being excited, too, but graded-index fibers show smaller than maximum acceptance angles for skew rays. Therefore, skew rays do not affect the NA-measurement of graded-index fibers.

Step-index fibers have larger acceptance for skew rays than for meridional rays. In order to only launch meridional rays, a small spot excitation at the center of the fiber has been proposed.

Defining the NA (Numerical Aperture) by the refractive indices of core and cladding can also be applied to single mode fibers. In contrast to the above, the NA (Numerical Aperture) does not describe the fibers's far field, because the ray-model cannot be applied to single-mode fibers. An accurate, but expensive method is the measurement of the refractive index profile. However, the disagreement between the NA (Numerical Aperture) and the sine of the 5%- far field angle is usually small.

In particular, the optical fibres according to the present invention have an overall external diameter in the 125–130 µm range. When such a diameter value is used, the present optical fibre will be clamped down lightly in the 125 µm ferrule or groove of the connector. When an external diameter of less than 125 μm is used, the optical glass fibre will come loose or be displaced in the connector, and when an external diameter of more than 130 μm is used, the pressure that the ferrule or groove exerts on the optical glass fibre will become so large that the outer protective coating will deform and possibly become detached from the glass fibre, as a result of which the optical glass fibre will be insufficiently protected locally. In a specific embodiment, the overall external diameter may be 120–125 μm, and an adhesive must generally be used so as to ensure a proper fixation in the ferrule or connector.

The protective coating used in the present invention may be built up of one or more sublayers; in an embodiment in which a single-layer protective coating is used, the thickness thereof must be at least 10 μm.

Furthermore, the core of the optical glass fibre, in which core the transmission of optical signals takes place, preferably has a diameter larger than or equal to the diameter of the core of the fibres of the preceding fibre object or that of the fibres from the supplying laser transmitters. If the diameter of the core is smaller than that of the preceding fibres, unacceptable coupling losses will occur, causing the signal to become excessively attenuated. It is desirable, therefore, for the core of a multimode fibre to have a diameter of about 50 μm or about 62.5 μm, which values correspond to those of the core diameter of the multimode fibres that are currently being used on a large scale. Such multimode fibres may also be supplied or be irradiated with common single mode fibres, without unacceptable coupling losses occurring.

The present description is based on the use of so-called standard connectors in glass fibre optical wiring systems, such as the connectors that have been developed and are manufactured for the standard glass fibres used in telecommunication systems. According to the prior art, the known quartz optical fibres are inserted into a precision ferrule, when a single connector is used, or in an etched row of grooves, when an "array" connector is used, after having been stripped of one or more protective coatings. The optical fibre is fixed therein by means of an adhesive, and the optical fibre is given its required surface quality by polishing so as to achieve a low connection attenuation. As already said before, the protective coating enveloping the known glass optical fibre has an external diameter of 250 μm.

On the other hand, when the method according to the present invention is used, the external dimensions of the optical glass fibre are adapted to such an extent that the overall external diameter of the optical glass fibre is of the same magnitude as the internal diameter of the ferrule or of the groove in an array connector half. According to the present invention, the optical glass fibre is fitted in the ferrule or the array groove in such a manner that the removal of the protective coating from the optical glass fibre is a thing of the past. This aspect provides significant advantages not only as regards the cost but also as regards the life of such a fibre when an automated process for providing the wiring is used. After all, the removal of the protective coating over a short length, as in the prior art, which operation is generally carried out by mechanical means, increases the risk of fracture of the optical fibre at some point during the working life of the connector. After the present optical glass fibre has been fitted in the connector, the end surface is polished. With a fibre fitting effected in this manner, the wiring thus obtained can be used for connecting the PCB or the BP. If an overall external diameter in the 120–125 μm range is used, it is preferable to include an adhesive in the ferrule or simply fix the fibre in position, so that the optical fibre is subjected to a clamping action, as a result of which the fibre cannot come loose or be displaced.

The present invention will be explained in more detail hereinafter by means of a number of examples; it should be noted, however, that the invention is by no means limited to such special examples.

EXAMPLE 1

A multimode optical glass fibre was produced by heating a glass preform and subsequently drawing a glass fibre having a diameter of 100 μm, a core diameter of 50 μm and an NA-value of 0.2 therefrom. During said drawing of the optical fibre, a protective coating of an acrylate resin, marketed by DSM Desotech, was coated on the fibre and subsequently cured through irradiation with UV light. The protective coating thus applied had a thickness of about 13 μm and an E-modulus ranging from 15 to 1000 MPa. The overall external diameter of the optical fibre was 126 μm. The optical fibre thus produced was provided with standard connectors for glass fibres having a glass diameter of 125 μm, after which the optical fibre was used to provide an optical connection between various PCB's.

EXAMPLE 2

A multimode optical glass fibre was produced by carrying out the same operations as described in Example 1, except that the diameter was 80 μm, however. The core diameter was 50 μm and the NA-value was 0.2. During the drawing of the optical fibre, a two-layer protective coating was coated on the fibre, with the inner protective layer being slightly softer than the outer protective layer. The first protective layer had a thickness of about 12 μm with an E-modulus ranging from 0.5 to 7 MPa, and the second protective layer had a thickness of about 12 μm with an E-modulus ranging from 25 to 1500 MPa, so that the overall external diameter of the optical fibre was about 128 μm. The optical fibre thus produced was provided with a standard connector in the same manner as described in Example 1, after which the optical fibre was used to provide an optical connection between various PCB's.

EXAMPLE 3

The same operations as described in Examples 1 and 2 were carried out, with this difference that a fibre having a core diameter of about 62.5 μm and an NA-value of 0.27 was used. After the protective coating had been applied, the optical fibre was provided with a standard connector for glass fibres having a glass diameter of 125 μm, after which the optical fibre was used to provide an optical connection between various PCB's.

The invention claimed is:
1. An optical fibre having an NA-value of less than 0.34, which optical fibre is built up of a core, a cladding, and an enveloping protective coating, wherein the protective coating forms the outer layer of the optical fibre with the overall external diameter of the optical fibre corresponding to the internal diameter of an element into which the end of the optical fibre is inserted;
   wherein the optical fibre has an overall external diameter in the 120–130 μm range;

wherein the protective coating is built up plural sublayers, which sublayers have mutually different E-modulus values; and further comprising an inner sublayer, in direct contact with the cladding, and an outer sublayer, wherein an E-modulus value of the inner sublayer is from 0.5 to 7 MPa, and an E-modulus value of the outer sublayer is from 25 to 1500 MPa.

2. An optical fibre according to claim 1, wherein an adhesive is used in the element into which the end of the optical fibre is inserted so as to ensure a proper fixation of the optical fibre therein.

3. An optical fibre according to claim 1, wherein the core has a diameter of about 50 μm or about 62.5 μm.

4. A method for providing optical wiring comprising:
using glass fibres, in which one or more connectors for standard glass fibres having a glass diameter of 125 μm are used, wherein an optical fibre as recited in claim 1 is used, and clamping down of the optical fibre in a ferrule or groove of the connector takes place in such a manner that the removal of the outer protective layer of the optical fibre is no longer necessary.

5. A method according to claim 4, wherein said clamping is carried out by using an adhesive.

6. The optical fibre according to claim 1, wherein the optical fibre has an NA value ranging from 0.15 to 0.30.

* * * * *